(No Model.)
C. W. SMART.
WHEEL.
No. 507,290. Patented Oct. 24, 1893.
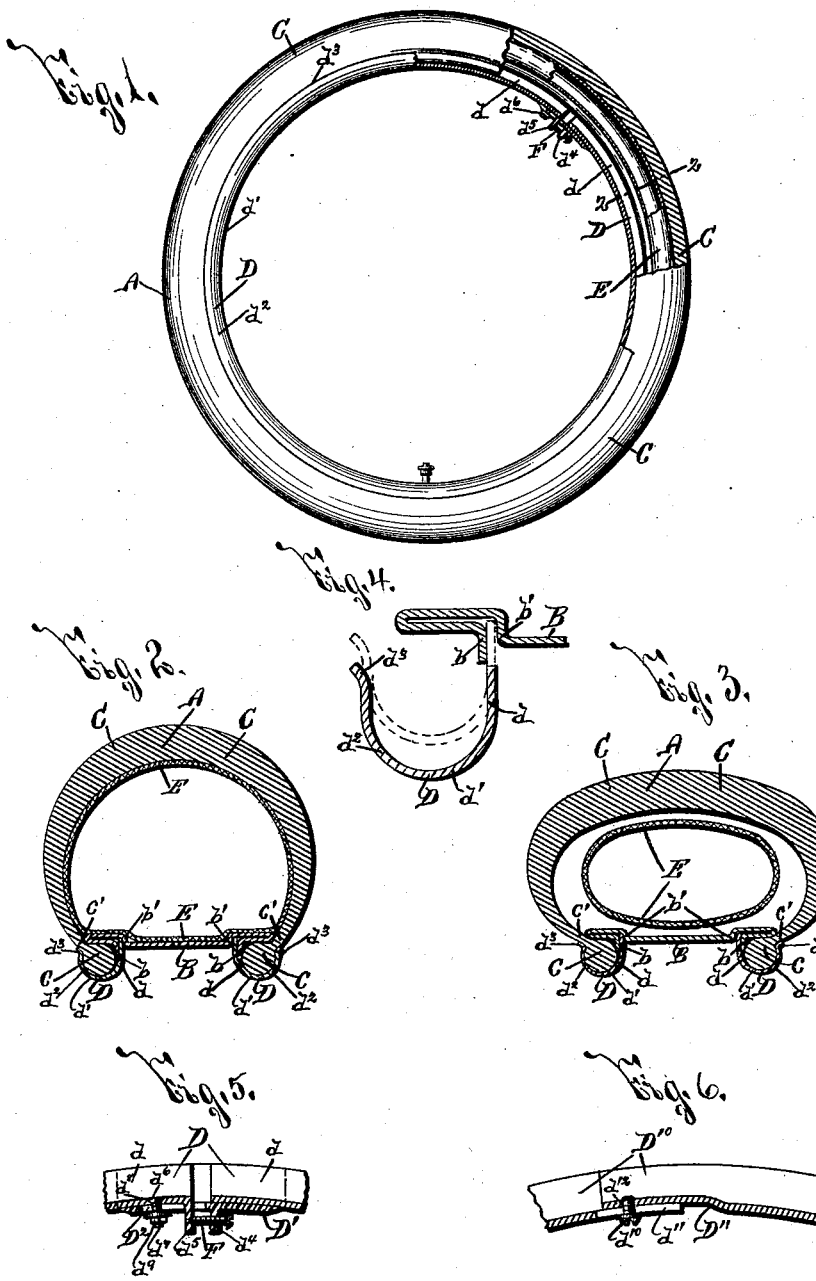

UNITED STATES PATENT OFFICE.

CHARLES W. SMART, OF CARBONDALE, ILLINOIS.

WHEEL.

SPECIFICATION forming part of Letters Patent No. 507,290, dated October 24, 1893.

Application filed January 12, 1893. Serial No. 458,185. (No model.)

*To all whom it may concern:*

Be it known that I, CHARLES W. SMART, of Carbondale, in the county of Jackson, in the State of Illinois, have invented new and useful Improvements in Wheels, of which the following, taken in connection with the accompanying drawings, is a full, clear, and exact description.

My invention relates to improvements in vehicle wheels and more particularly to those designed for bicycles or velocipedes, and has for its object the production of a simple, practical, economical, and effective construction, in which the tire is easily removed and replaced; and to this end it consists, essentially, in a rim formed with inwardly extending shoulders at its side edges arranged in planes within the planes of the side edges of the rim, a tire having separated edges, and a pair of expansible bands engaged with the inwardly extending shoulders of the rim and with the outer faces of the separated edges of the tire.

The invention furthermore consists in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a side elevation, partly in section, of my improved wheel. Fig. 2 is a transverse vertical sectional view, taken on line —2—2—, Fig. 1. Fig. 3 is a similar sectional view, the pneumatic sack being shown as but partly distended. Fig. 4 is a detail cross sectional view of a portion of the rim and one of the expansible bands of my wheel, the parts being shown as slightly separated in full lines and as in their normal position in dotted lines. Fig. 5 is a detail sectional view of the adjacent ends of one of the bands for holding the tire in position and the clamp for increasing the diameter of said band, and Fig. 6 is a similar detail sectional view of a slightly modified form of clamp for securing together the adjacent ends of the bands for holding the tire in position.

My improved wheel —A— is composed of a hub and spokes, not illustrated, a rim or felly —B— a tire —C— bands —D—D— and a pneumatic sack —E.

The rim —B— is formed at its edges with inwardly extending substantially flat shoulders —b—b— arranged in planes within the planes of the outer edges of said rim and with inner shoulders —b'—b'— slightly separated from the shoulders —b—b—. This rim is preferably formed of a single piece of sheet metal having its edges lapped upon each other for forming the shoulders —b—b— and its central portion formed of less diameter than its outer edges for forming the shoulders —b'—b'.—

The tire —C— may be of any desirable form, size, and construction, and is shown as provided with separated thickened edges —c—c— of rounding cross section; the inner faces of which bear normally against the outer faces of the inwardly extending shoulders —b—b— of the rim —B—.

The bands —D—D— are open or broken, are similar in construction, and are so formed and arranged as to firmly secure the separated tire edges —c—c— to the edges of the rim —B—, and to permit the disengagement of one or both of the tire edges from said rim when desired. Each of these bands —D—D— is formed substantially concavo-convex in cross section, and is formed with a substantially flat outwardly extending shoulder —d— at its inner side, a curved central or inner portion —d'—, and a curved outwardly extending shoulder —d²— at its outer side, formed with a flaring edge —d³—. The shoulder —d— of each of the bands is engaged with the inner face of the corresponding shoulder —b— of the rim and with the outer face of the adjacent shoulder —b'—, and the shoulder —d²— is engaged with the outer face of the corresponding edge —c— of the tire —C—, and its outturned edge —d³— fits the adjacent portion of the neck —c'— of the tire —C—, and presses the same against the adjacent edge of the rim —B—.

The adjacent ends of the open bands —D—D— are separated one from the other in order to increase the diameter of the bands and force the same to operative position for firmly securing the edges of the tire —C— to the rim —B—. I preferably force apart the ends of each of the bands —D—D— by an adjuster or screw —F— having one end screw-threaded and engaged with lug —$d^4$— on one end of the band —D— and the other bearing against a lug —$d^5$— upon the opposite end of said band. When desired to remove the tire, the diameter of one of the bands is decreased by moving the screw —F— away from the lug —$d^5$— and permitting the ends of the band, which is formed of spring metal, to move toward each other, and the tire is then readily removed. One of the ends of each of the bands —D— is preferably provided with an inner section —D'— having one end rigidly secured to said end of the band and the other end lapping upon the opposite end of the band. The lug —$d^4$— is preferably formed upon the end of the section —D'— rigidly secured to one end of the band, by bending down a portion of said section, and the opposite end of the section is formed with a slot —$D^2$— through which the lug —$d^5$— is movable.

After the desired adjustment of the bolt or adjuster —F— the ends of the expansible rings are held in their adjusted position by suitable clamps —$d^6$—, each consisting of a bolt —$d^7$— passed through the slot —$d^2$— and a perforation —$d^8$— in the overlapping end of the band —D— and a nut —$d^9$— screwing upon said bolt.

The pneumatic sack —E— is of any desirable construction, and, when inflated in the usual manner, bears against the outer face of the rim —B— and the inner face of the tire —E—.

In practically assembling my invention one of the edges of the tire —C— is operatively engaged with the corresponding shoulder —$b$— of the rim —B—, and the corresponding band —D— is then forced to operative position. The other edge of the tire —C— is then engaged with the opposite shoulder —$b$—, and the second band —D— also forced to operative position. When desired to remove the tire the sack —H— is deflated, and the diameter of the bands is decreased, as previously described, and the edges of the tire are then readily withdrawn from between said bands and shoulders —$b$—$b$—.

At Fig. 6 I have shown in section the adjacent ends of a slightly modified form of open band —$D^{10}$— having one end lapped upon the other and provided with a recess —$D^{11}$— for receiving the adjacent end. A suitable clamp —$d^{10}$— of similar construction to the clamp —$d^6$—, previously described, is passed through perforations —$d^{11}$— and —$d^{12}$— in the respective ends of said band for securing the same together.

It will be readily understood that the particular form of clamp for securing together the ends of the expansible bands of my improved invention forms no essential feature thereof, as any clamp well known to one skilled in the art may be used. It will also be evident to one skilled in the art that one of the bands may be dispensed with, and one side of the tire secured to the rim in any other suitable manner before the opposite side is secured, and that the opposite side may then be secured by a single expansible band of similar construction and arrangement to those previously described.

My invention is cheaply manufactured, is readily assembled, and is practical and efficient. It will be understood, however, that I do not herein limit myself to the detail construction and arrangement of its parts, as the same may be somewhat varied therefrom without departing from the spirit of my invention.

Having thus fully described my invention, what I claim as new, and desire to secure by Letters Patent, is—

1. In a wheel, the combination of a rim having an inwardly extending shoulder —$b$— at one of its side edges, a tire having separated edges, one being supported, substantially as described, upon one edge of the rim and the other being arranged at the outside of the shoulder —$b$— for bearing thereagainst, and a band —D— provided with an outwardly extending shoulder —$d$— arranged at the inner side of the shoulder —$b$—, a central portion —$d'$— inside of the corresponding tire edge, and an outwardly extending shoulder —$d^2$— at the outer side of the tire edge, said band being extensible and contractible in diameter, substantially as and for the purpose set forth.

2. In a wheel, the combination of a rim having an inwardly extending shoulder —$b$— arranged inside the outer edge of said rim, a tire having separated edges, one being supported, substantially as described, upon one edge of the rim and the other being arranged at the outside of the shoulder —$b$— for bearing thereagainst, and a band —D— provided with an outwardly extending shoulder —$d$— arranged at the inner side of the shoulder —$b$—, a central portion —$d'$— inside of the corresponding tire edge, and an outwardly extending shoulder —$d^2$— at the outer side of the tire edge provided with a flaring or outturned edge —$d^3$—, said band being extensible and contractible in diameter, substantially as and for the purpose described.

3. In a wheel, the combination of a rim having its opposite edges lapped upon each other and each provided with an inwardly extending shoulder —$b$— arranged inside of the normal outer edges of said rim, a tire having separated edges —$c$—$c$— arranged at the outside of the shoulders —$b$—$b$—, open bands —D—D— each having an inner outwardly extending shoulder —$d$— arranged at the inner side of the corresponding shoulder —$b$—, a portion —$d'$— arranged at the inside of the tire edge bearing against said shoulder —$d$—, and an outwardly extending shoulder —$d^2$— arranged at the outer side of said tire shoulder and formed with an outturned or flaring portion —$d^3$—, and clamps for engaging the adjacent ends of said open bands and operating the same, substantially as and for the purpose set forth.

4. In a wheel, the combination of a rim having shoulders at its side edges and having an annular shoulder at the inner side of one of said shoulders, a tire having separated edges, one being supported upon one of the shoulders and the other bearing against the outer face of the shoulder adjacent to said annular shoulder, an open band having a shoulder at its inner side engaged with the inner face of said shoulder of the rim and with the adjacent face of said annular shoulder and having a shoulder at its outer side engaged with the outer face of the adjacent edge of the tire, and a clamp for securing the adjacent edge of said open band in operative position, substantially as and for the purpose specified.

5. In a wheel, the combination of a rim formed with annular inner shoulders and with inwardly extending shoulders at its side edges arranged in a plane within the outer edges of said rim, bands expansible in diameter formed substantially concavo-convex in cross section and having shoulders at their inner sides interposed between the inner faces of said inwardly extending shoulders of the rim and the outer faces of the adjacent annular shoulders, and formed at their outer sides with shoulders arranged in proximity to the outer edges of the rim and formed with flaring edges, and a tire having thickened edges interposed between said expansible bands and the rim, whereby the tire is firmly held in position, substantially as set forth.

6. In a wheel, the combination of a rim formed with annular inner shoulders and with inwardly extending shoulders at its side edges arranged in planes within the outer edges of said rim, bands expansible in diameter formed substantially concavo-convex in cross section and having shoulders at their inner sides interposed between the inner faces of said inwardly extending shoulders of the rim and the outer faces of the adjacent annular shoulders and formed at their outer sides with shoulders arranged in proximity to the outer edges of the rim and formed with flaring edges, a tire having thickened edges interposed between said expansible bands and the rim, whereby the tire is firmly held in position, and an inflatable sack interposed between said tire and the rim, substantially as and for the purpose set forth.

In testimony whereof I have hereunto signed my name, in the presence of two attesting witnesses, at Syracuse, in the county of Onondaga, in the State of New York, this 3d day of January, 1893.

CHARLES W. SMART.

Witnesses:
CLARK H. NORTON,
E. A. WEISBURG.